US00RE37625E

(19) United States
(12) Reissued Patent
Wieder et al.

(10) Patent Number: US RE37,625 E
(45) Date of Reissued Patent: Apr. 9, 2002

(54) TONGUE HYGIENE DEVICE

(75) Inventors: Steven M. Wieder; Thomas A. Oechslin, both of Sarasota, FL (US)

(73) Assignee: Peak Enterprises, Inc., Sarasota, FL (US)

(21) Appl. No.: 09/314,181

(22) Filed: May 18, 1999

Related U.S. Patent Documents

Reissue of:
(64) Patent No.: 5,749,116
Issued: May 12, 1998
Appl. No.: 08/782,923
Filed: Jan. 13, 1997

(51) Int. Cl.[7] ..... A46B 9/02; A46B 9/06
(52) U.S. Cl. ..... 15/160; 15/143.1; 15/167.1
(58) Field of Search ..... 15/143.1, 160, 15/167.1; D4/104, 111

(56) References Cited

U.S. PATENT DOCUMENTS

| | | | | | |
|---|---|---|---|---|---|
| 381,749 | A | * | 4/1888 | Ashburner | |
| 457,007 | A | * | 8/1891 | Osborn | |
| 758,109 | A | * | 4/1904 | Sandiford | 15/167.1 |
| 800,422 | A | * | 9/1905 | White | |
| 2,064,860 | A | * | 12/1936 | Sekine | |
| 2,155,245 | A | * | 4/1939 | Sekine | 15/167.1 |
| D142,917 | S | * | 11/1945 | Streiby | |
| 2,582,552 | A | * | 1/1952 | Marco | |
| 2,651,068 | A | * | 9/1953 | Seko | 15/167.1 |
| 3,067,446 | A | * | 12/1962 | Bhaskar et al. | 15/167.1 |
| 4,274,174 | A | * | 6/1981 | Ertel | 15/143.1 |
| 4,538,521 | A | * | 9/1985 | Prince | |
| 4,638,521 | A | * | 1/1987 | Potente et al. | |
| 5,217,475 | A | * | 6/1993 | Kuber | |
| 5,226,197 | A | * | 7/1993 | Nack | |
| 5,398,369 | A | * | 3/1995 | Heinzelman et al. | 15/143.1 |
| 5,613,262 | A | * | 3/1997 | Choy-Muldunado | 15/167.1 |

FOREIGN PATENT DOCUMENTS

| | | | | |
|---|---|---|---|---|
| CH | 169650 | * | 8/1934 | |
| DE | 325419 | * | 10/1927 | |
| DE | 451111 | * | 10/1927 | |
| FR | 881678 | * | 5/1943 | 15/167.1 |
| GB | 18886 | * | of 1905 | |
| GB | 19886 | * | of 1905 | |
| GB | 141640 | * | 4/1920 | |
| GB | 484331 | * | 5/1938 | |
| IT | 325419 | * | 6/1936 | |

OTHER PUBLICATIONS

Dr. Gizmo, Forbes magazine, 1995 FYI, pp. 48 and 50.*

* cited by examiner

*Primary Examiner*—Terrence R. Till
(74) *Attorney, Agent, or Firm*—Hahn Loeser + Parks LLP

(57) ABSTRACT

A tongue hygiene device to be used with a mildly abrasive cleanser, the tongue hygiene device having a generally elongate handle section and a generally disk-shaped cleansing section. The handle section is ergonomically designed to allow the user to effectively and comfortably hold the tongue hygiene device in proper cleansing alignment with the tongue. The cleansing section includes three generally parallel, circular patterns of medium-length bristles of medium stiffness, protruding from a generally disk-shaped cleansing head, the cleansing head having a top face, and a bottom face from which the bristles protrude, and a large aperture extending between the centers of the bottom and top faces which is surrounded by the bristles on the bottom face. The bristles allow the tongue hygiene device to cleanse the tongue by brushing bacteria and food buildup from the tongue using a mildly abrasive cleanser. The aperture allows air and the lather formed by brushing with a cleanser to pass through the head element, thereby increasing the lather and facilitating the passage of bacteria and food buildup away from the surface of the tongue, and provides a conduit for the passage of air and water through the head element during cleaning of the tongue hygiene device, expediting and simplifying cleaning of the tongue hygiene device and hastening drying of the bristles.

13 Claims, 2 Drawing Sheets

TONGUE HYGIENE DEVICE

Matter enclosed in heavy brackets [ ] appears in the original patent but forms no part of this reissue specification; matter printed in italics indicates the additions made by reissue.

The present invention relates to a tongue hygiene device. More particularly, the present invention relates to a tongue brush which allows for convenient and effective hygienic cleansing of a user's tongue, thereby facilitating the elimination of bacteria and food buildup from the tongue.

BACKGROUND OF THE INVENTION

Oral hygiene has long been a concern in our society. Generally, individuals who have desired to improve their oral hygiene have done so by caring for their teeth, especially by brushing and flossing their teeth. Recently, however, research has revealed that the predominant source of bad breath is bacteria and food buildup on the dorsum (or top) of the tongue. Therefore, individuals who desire to prevent bad breath, and thereby improve their overall oral hygiene, should cleanse their tongues as well.

The tongue, however, being an irregularly-shaped mobile mass of striated muscle covered by mucous membrane, is not an easy surface to cleanse. While the tongue's muscular nature allows its shape to be altered quickly and extensively in performing its functions, that same muscular nature and rapid and extensive alteration of shape prevents convenient cleansing. Furthermore, the tongue has a number of large and small furrows, grooves, folds, and protrusions along its dorsum and margins (or sides), as well as microscopic projections and cavities formed by papillae and lymph follicles on the surface of the dorsum. As a result, the tongue's surface is uneven both macroscopically and microscopically. That lack of evenness makes cleansing of the tongue even more difficult.

A number of means of cleansing the tongue are known in the prior art. All of these means utilize one of two methods: brushing or scraping (or both). Means for cleansing the tongue known in the prior art include conventional toothbrushes, tongue scrapers, combination scraper-brushes, and complex brush devices. Each of those means known in the prior art, however, has significant deficiencies, either in cleansing or other defects.

Brushing is most commonly done using a mildly abrasive cleansing medium, such as toothpaste. Brushing helps remove bacteria and food buildup in two ways. First, bristles individually dislodge and extract materials from the surface being brushed by exerting a vertical and lateral pressure on those materials. Second, once materials are extracted from the surface being brushed, they are transported away from the surface being brushed by the cleansing medium, which is itself lathered and communicated by the collective agitation of bristles. In order to form lather, the tips of bristles must flex sufficiently to cause local agitation of the cleansing material. The tips of bristles must also flex to assist in the communication of the lathered cleansing medium away from the surface being brushed, most often by allowing for foaming. However, the tips of bristles must also be somewhat firm in order to exert sufficient vertical and lateral pressure to dislodge bacteria and food lodged in the surface being brushed. Examples of brushing devices in the prior art are conventional toothbrushes and complex brush devices.

Scraping, in contrast, is most commonly done without the aid of a cleansing medium. By exerting only a lateral pressure on the surface of the tongue, the scraping element is designed to merely dislodge and extract bacteria and food buildup from the uniform surface features of the dorsum of the tongue; generally the only vertical pressure exerted is due to the weight of the scraping element itself. Once those materials are extracted from the scraped surface, they are transported away from the scraped surface on the face of the scraping element. However, scraping devices are only minimally effective at dislodging and removing bacteria and food buildup from only the uniform surface features of the dorsum. Moreover, due to their simple designs, scraping devices are not at all effective at dislodging and removing bacteria and food buildup from the uneven features of the dorsum, especially the microscopic features. Examples of scraping devices in the prior art are scrapers and combination scraper-brushes.

Conventional toothbrushes, while being perhaps the most common devices used to cleanse the tongue, suffer some of the most significant deficiencies in both cleansing and use-related aspects. Conventional toothbrushes are specifically constructed to cleanse the teeth, not the tongue, effectively. As a result, individual toothbrush bristles must be long enough to get below the gingival tissue and build sufficient lather for cleansing, yet not be so abrasive as to damage the teeth or surrounding gingival tissue. Longer bristles are also typically used to minimize abrasiveness since longer bristles tend to be more pliable when pressure is exerted on them given the physics involved. Moreover, the overall width of the head and bristles must be sufficiently slender to fit into the narrow areas of the mouth between the teeth and cheek. As a result, conventional toothbrushes have a high profile (measured from the bottom of the bristle to the top of the head), soft bristles, and a narrow cleansing area.

Those same characteristics that make conventional toothbrushes especially effective at cleaning the teeth make them unsuitable for cleansing the tongue. First, conventional toothbrushes tend to have a high profile due to their long, soft bristles. The length of such bristles allows a toothbrush to reach into the crevices between and around teeth and provides a safe margin between the tips of the bristles and the hard base of the toothbrush, but also makes the toothbrush difficult to fit into the rear portion of the mouth. That is significant in that such a brush cannot be used easily to cleanse the tongue without causing a "gag reflex" to occur. Second, although the softness of the bristles of conventional toothbrushes prevents damage to the teeth and gingival tissue, such softness also makes it difficult to exert sufficient downward pressure on the tongue with the bristles so as to dislodge bacteria and food buildup from the tongue and its numerous crevices and contours effectively. Third, while the generally slender configuration of the cleansing head on conventional toothbrushes allows them to fit into the narrow spaces between lips and teeth and the tongue and teeth, it prevents such devices from covering a sufficient surface area quickly, as is required to provide efficient cleaning over the wide surface area presented by the tongue. Accordingly, conventional toothbrushes are unsuitable for cleansing the tongue.

Also known in the prior art are a few devices specifically directed toward cleansing the tongue. Most of these devices are directed toward scraping the tongue, either with a specific scraper or very short bristles. Like conventional toothbrushes, however, these devices suffer significant deficiencies in both cleansing and other defects. First, as discussed above, devices that employ scrapers or very short bristles to scrape the tongue cannot cleanse the numerous contours of the tongue effectively because they cannot penetrate into the furrows, grooves, folds, and cavities of the tongue, especially the microscopic features. Nor can such devices accommodate cleansing of the protrusions or projections from the surface of the tongue while maintaining contact with surface of the tongue. Second, such devices are not conducive to use with a cleansing medium because they either lack substantial, flexible bristles which will build lather, or provide only minimal space between the tongue and the solid portion of the head of the device, thereby preventing the scrubbing action necessary to build lather for cleansing the tongue. Because of the lack of lather, bacteria and food buildup in the uneven features of the tongue are not transported away from the surface of the tongue by a scraper device or one with very short bristles.

Combination scraper-brushes tend to suffer the same problems as scrapers, as well as several additional problems. First, for the scraper and bristles both to be effective, both must be relatively short (otherwise the device will have too high a profile and, like conventional toothbrushes, will elicit a strong "gag reflex"). Because the scraper must be short, mucous and food tend to accumulate between the scraper blade and the head of the device, decreasing the effectiveness of the scraper and making it difficult to clean. Because the bristles must be short, they are abrasive, uncomfortable and potentially injurious to the user, do not flex or agitate enough to develop lather effectively, and tend to "gum up" with mucous, food, and dried cleaning media. As a result, combination scraper-brushes tend to be less effective in use than either scrapers or brushes and also tend to be more difficult to clean.

Complex brush devices are also known in the prior art. Such devices generally use motors or complex mechanical systems to agitate the bristles of the brush. They are, accordingly, expensive, more prone to break, and more difficult to control than simpler brushes.

It is, therefore, an object of the present invention to provide a tongue hygiene device which can cleanse the dorsum of the tongue, including macroscopic and microscopic features, effectively. It is also an object of the present invention to provide such a tongue hygiene device that can brush the surface of the tongue, form lather from a cleansing medium, and assist in the communication of the lathered cleansing medium away from the surface being brushed through foaming, yet not abrade the surface of the tongue. It is a further object of the present invention to provide a tongue hygiene device that can be used and cleaned easily and can be produced relatively inexpensively.

SUMMARY OF THE INVENTION

These objects and others are achieved according to the present invention by a tongue hygiene device which allows the tongue to be brushed, generally with a mildly abrasive cleanser. The tongue hygiene device includes a generally elongate handle section and a generally disk-shaped cleansing section. The handle section is ergonomically designed to allow the user to hold the tongue hygiene device comfortably in proper cleansing alignment with the tongue. The cleansing section includes three generally parallel circular patterns of medium-length bristles of medium stiffness, protruding from a generally disk-shaped head element which has a top face, a bottom face from which the bristles protrude, and a large aperture extending between the centers of the bottom and top faces which is surrounded by the bristles on the bottom face. The bristles allow the tongue hygiene device to be used to cleanse the tongue by brushing bacteria and food buildup from the tongue, generally with a mildly abrasive cleanser. The aperture allows air and the lather formed by brushing with a cleanser to pass through the head element, thereby increasing the lather and facilitating the passage of bacteria and food buildup away from the surface of the tongue. The aperture also provides a conduit for the passage of air and water through the head element during cleaning of the tongue hygiene device, expediting and simplifying cleaning of the tongue hygiene device and hastening drying of the bristles. Due to the absence of bristles where the aperture is located, the circular pattern of bristles surrounding the aperture are able to flex inward without meeting any resistance from other bristles, allowing more intense scrubbing of the deeper furrows, folds grooves and cavities near the center of the dorsum. As a result, the unique circular pattern of bristles surrounding the aperture provides the optimal design for cleansing both the margins and deep inner features of the dorsum of the tongue.

Further object, features, and advantages of the invention will become evident from a consideration of the following detailed description when taken in conjunction with the accompanying drawings and appended claims.

BRIEF DESCRIPTION OF THE DRAWINGS

To facilitate an understanding of the invention, a preferred embodiment thereof is illustrated in the accompanying drawings, from an inspection of which, when considered in connection with the following description, its construction, its operation, and many of its advantages should be readily understood and appreciated.

DETAILED DESCRIPTION OF THE PREFERRED EMBODIMENT

Figure 1:
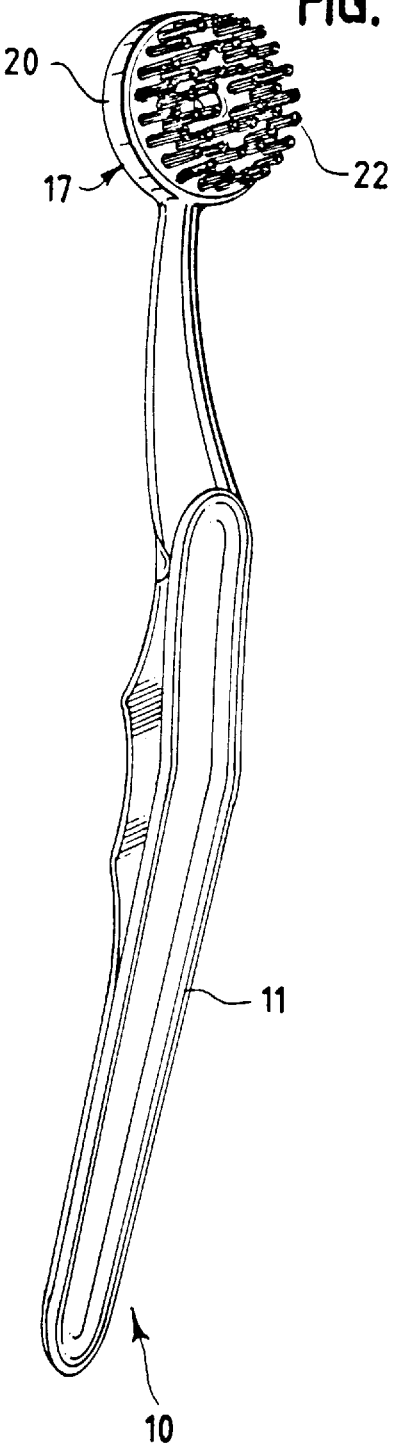
FIG. 1 is a perspective view of a tongue hygiene device of the present invention.
Figure 2:
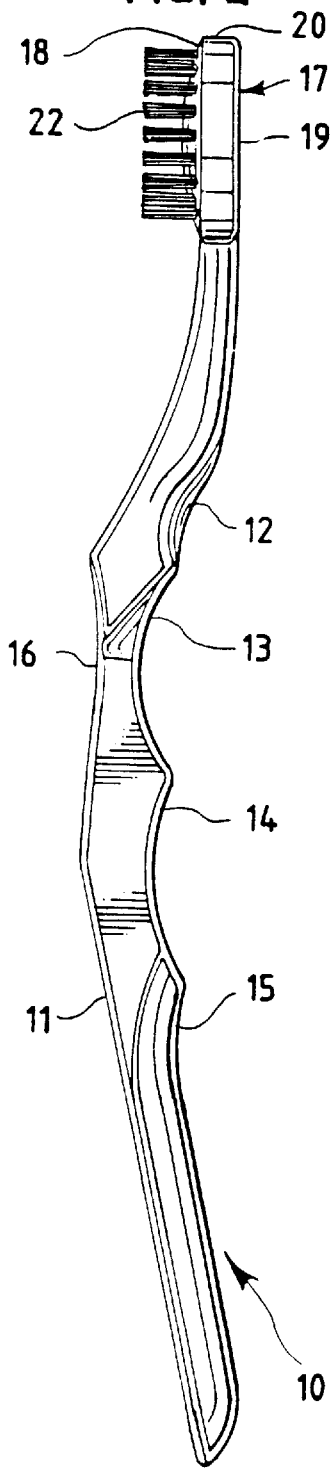
FIG. 2 is a side plane view of the present invention.
Figure 3:
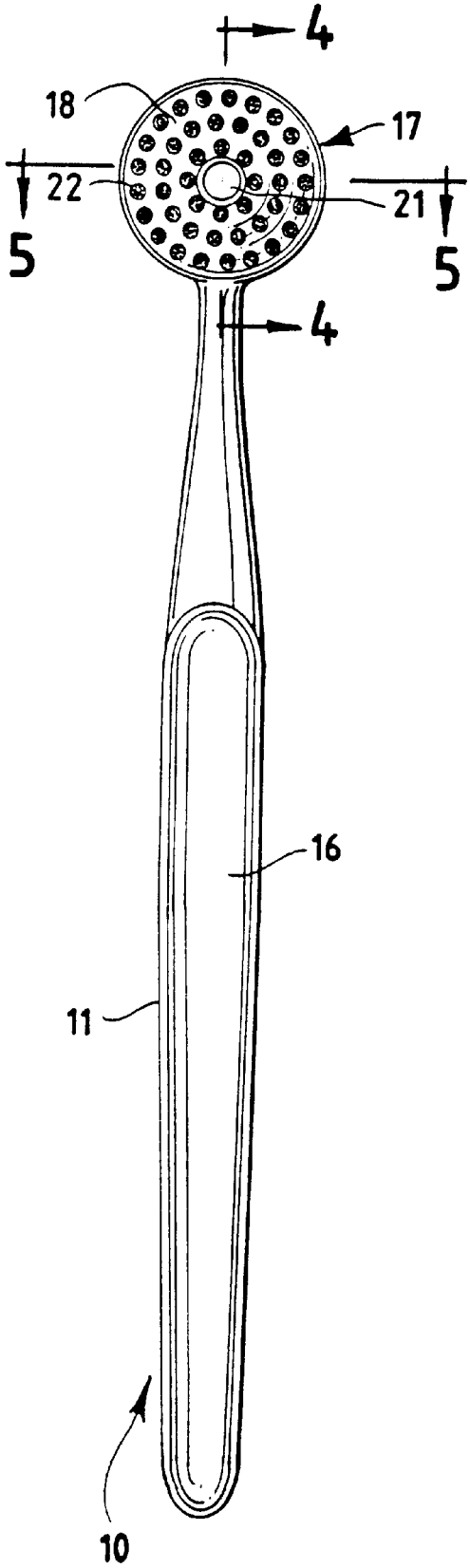
FIG. 3 is a bottom plane view of the present invention.

FIGS. 1 through 5 illustrate a tongue hygiene device as described [an] *and* claimed in this application. As shown in FIGS. 1, 2, and 3, the tongue hygiene device 10 comprises two portions: a generally elongate handle portion 11 and a generally disk-shaped cleansing head portion 17. Also as shown in FIGS. 1, 2, and 3, the cleansing head 17 is disposed at one end of the handle portion 11.

As shown in FIG. 2, the generally elongate handle portion 11 of the tongue hygiene device 10 is ergonomically structured to be conveniently and effectively gripped by a user. Specifically, in a preferred embodiment of the tongue hygiene device, the handle portion 11 features five separate finger notches 12, 13, 14, 15 and 16 to fit the fingers and thumb of the user comfortably and to prevent slippage. Unlike conventional toothbrushes, which may include finger notches designed to be used to hold the toothbrush with the cleansing head angled sidewards (towards the gingival tissue between the teeth and gum), finger notches 12, 13, 14, 15 and 16 are ergonomically designed to facilitate placement of the user's fingers and thumb during use of the tongue hygiene device with the bristles 22 of the cleansing head 17 angled downward. This design allows the tongue hygiene device to be equally effective whether used by a right-handed or left-handed user. The handle portion 11 also features a thumb rest 16 so that the thumb can assist in gripping the handle portion 11 firmly during use. Further, in a preferred embodiment of the tongue hygiene device, the handle portion 11 is formed of a generally plastic material so as to facilitate cost-effective manufacturing and provide for some resilience during use. Disposed at the distal end of the handle portion 11 is a cleansing head 17. *The proximal and distal portions of the handle meet at an angle of less than 180 degrees, as measured on the top surface.* Due to the ergonomic construction of the handle portion 11, an individual holding the handle portion 11 can easily pass the cleansing head 17 over the teeth for convenient and comfortable manipulation of the tongue hygiene device and cleansing of the tongue.

Figure 4:
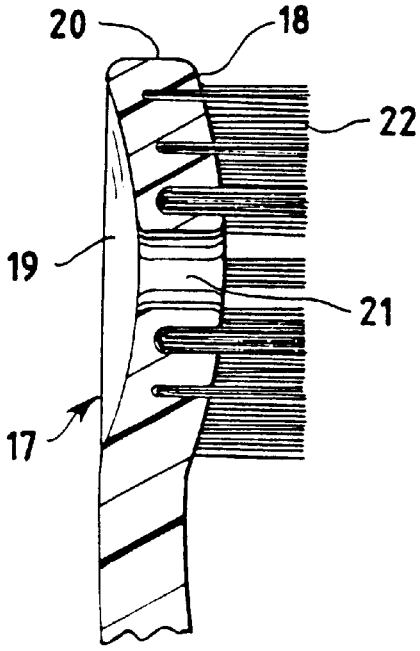
FIG. 4 is a detailed side cross-sectional view of a portion of the present invention.
Figure 5:
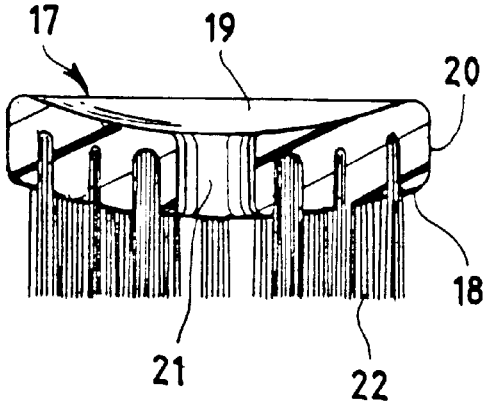
FIG. 5 is a detailed front cross-sectional view of a portion of the present invention.

As shown in FIGS. 2, 4 and 5, the cleansing head 17 of the tongue hygiene device 10 includes a bottom face 18, a top face 19, and a side edge 20. The cleansing head 17 is structured to fit comfortably and conveniently within an individual's mouth. In a preferred embodiment of the tongue hygiene device as shown in FIGS. 1 and 3, the cleansing head 17 has a generally disk-shaped configuration of approximately one inch in diameter, thereby maximizing the surface area to be brushed during use while facilitating convenient and comfortable passage into a user's mouth. As shown in FIG. 2, the side edge 20 of the cleansing head 17 is narrow so as to diminish the height of the cleansing head and maximize the clearance between the cleansing head and the top surface of the interior of the mouth to avoid a gag reflex during brushing, yet not so narrow that the cleansing head 17 lacks sufficient rigidity to cleanse the tongue adequately. In a preferred embodiment of the tongue hygiene device as shown in FIG. 2, the side edge 20 of the cleansing head 17 has a thickness of approximately one-quarter inch. Further, the side edge 20 preferably includes a rounded and highly polished surface which will curtail any abrasion that might occur due to contact between the side edge 20 of the cleansing head 17 and the interior of the mouth.

As shown in FIGS. 2, 4 and 5, protruding from the bottom face 18 of the cleansing head 17 are a plurality of bristles 22. In a preferred embodiment of the tongue hygiene device as shown in FIGS. 4 and 5, each individual one of these bristles 22 will be formed from a plurality of strands of nylon, or another like material. Through such a construction, the needs for stiffness and flexibility of the bristles 22 can be balanced to render the bristles effective for both dislodging bacteria and food buildup and forming lather. Furthermore, as shown in FIG. 2, an aperture 21 is formed through the center of the bottom face 18 of the cleansing head 17. As shown in FIGS. 4 and 5, the aperture 21, which is preferably cylindrical, extends through the bottom face 18 and the top face 19 of the cleansing head 17 parallel to the side edge 20. The aperture 21 allows easy passage of air and liquid through the cleansing head 17. In a preferred embodiment of the tongue hygiene device as shown in FIG. 3, the aperture has diameter of one-quarter inch. Accordingly, during use, the admissibility of fluid between the cleansing head 17 and an individual's tongue facilitates the formation of an effective cleaning lather by the bristles 22. Due to the absence of bristles 22 on the bottom face 18 at the location of the aperture 21, the bristles 22 surrounding the aperture 21 are able to flex inward, toward the center of the aperture 21, without meeting any resistance from the other bristles 22, allowing more intense scrubbing of the deeper furrows, folds, grooves and cavities near the center of the dorsum of the tongue. Additionally, the cleansing head 17 and a base of the bristles 22 can be effectively and conveniently cleaned as fluid freely flows through the aperture 21 in the cleansing head 17.

As shown in FIGS. 1 through 5, the bristles 22 will preferably have a stiffness or tensile strength sufficient to permit downward pressure necessary to dislodge particles from the tongue without complete dispersement or bending while providing sufficient flexibility to permit an effective scrubbing and cleansing of the tongue. In a preferred embodiment of the tongue hygiene device, the bristles 22 will have a stiffness or tensile strength approximating that of medium stiffness bristles of a conventional toothbrush. Further, in a preferred embodiment of the tongue hygiene device, the bristles 22 protrude approximately one-quarter inch from the bottom face 18 of the cleansing head 17 and, as a result, are able to delve into the various contours and crevices formed on the tongue in an effective and convenient manner. *As is further shown, the cleaning head portion 17 is at a different planar orientation than the distal portion of the handle.*

The invention has been described above in an illustrative manner and it is to be understood that terminology which has been used is intended to be in the nature of description rather than of limitation. Obviously many modifications and variations of the present invention are possible in light of the above teachings. It is therefore to be understood that within the scope of the appended claims, the invention may be practiced otherwise than as specifically described.

What is claimed is:

1. A tongue hygiene device for use with a mildly abrasive cleansing medium, comprising:

a generally elongate handle having a top surface, a bottom surface, and proximal and distal ends, said handle being ergonomically designed to provide finger notches for placement of a user's fingers on the top surface of said distal handle portion and wherein the bottom surface is substantially smooth except for a single thumb notch for placement of a user's thumb and;

a generally disk-shaped cleansing head portion disposed at the proximal end of said handle portion structured to fit within a user's mouth, said cleansing head portion having a bottom face, a top face, a side edge and an aperture located centrally therethrough to permit passage of fluid and air; and a plurality of bristles protruding from the bottom face of said cleansing head portion in a generally perpendicular relation thereto.

2. A tongue hygiene device as recited in claim 1 wherein said bristles are disposed in a generally parallel circular pattern extending outward from said aperture toward said side edge.

3. A tongue hygiene device as recited in claim 1 wherein said bristles have a medium stiffness.

4. A tongue hygiene device as recited in claim 1 wherein said bristles protrude approximately one-quarter inch from the bottom face of said cleansing head portion.

5. A tongue hygiene device as recited in claim 1 wherein the diameter of the disk formed by said cleansing head portion measures approximately one inch.

6. A tongue hygiene device as recited in claim 1 wherein the height of the side edge of said cleansing head portion measures approximately one-quarter inch.

7. A tongue hygiene device as recited in claim 1 wherein the side edge of said cleansing head portion has a rounded and highly polished surface.

8. A tongue hygiene device as recited in claim 1 wherein each of said bristles includes a plurality of individual strands.

9. A tongue hygiene device as recited in claim 1 wherein the aperture located centrally through the bottom face and top face of said cleansing head portion has a diameter of approximately one-quarter inch.

10. A tongue hygiene device for use with a cleansing medium, comprising:

a generally elongate handle having a top surface, a bottom surface, and proximal and distal portions, said distal portion having notches for placement of a user's fingers on the top surface of said distal portion and the bottom surface is substantially smooth except for a notch for placement of a user's thumb[, said notches orienting said handle in a single position in said user's hand];

said proximal portion being curved and being attached to said distal portion;

a [generally disk-shaped] cleansing head portion disposed at said proximal portion structured to fit within a user's mouth, said cleansing head portion having a bottom face, a top face, *and* a side edge [and an aperture located centrally therethrough to permit passage of fluid and air,] wherein the cleansing head portion is at a different planar orientation than the distal portion; and a plurality of bristles protruding from the bottom face of said cleansing head portion [in a generally perpendicular relation thereto], *the notches facilitating placement of the user's fingers and thumb during use with the bristles angled downward.*

*11. A tongue hygiene device, comprising:*

*a generally elongate handle having a top surface, a bottom surface, and proximal and distal ends, said handle being ergonomically designed to provide finger notches for placement of a user's fingers on the top surface of said distal handle portion and wherein the bottom surface is substantially smooth except for a single thumb notch for placement of a user's thumb on the bottom surface of said handle portion;*

*a cleansing head portion disposed at the proximal end of said hancle portion structured to fit within a user's mouth, said cleansing head portion having a bottom face, a top face, and a side edge; and*

*a plurality of bristles protruding from the bottom face of said cleansing head portion in a generally perpendicular relation thereto.*

*12. The tongue hygiene device of claim 11, wherein the proximal and distal portions of the handle meet at an angle of less than 180 degrees, as measured on the top surface.*

*13. A tongue hygiene device, comprising:*

*a generally elongate handle having a top surface, a bottom surface, and proximal and distal ends, said handle being ergonomically designed to provide for placement of a user's fingers on the top surface of said distal handle portion an wherein the bottom surface is substantially smooth except to provide for placement of a user's thumb on the bottom surface of said handle portion, the proximal and distal portions of the handle meeting at angle of less than 180 degrees, as measured on the top surface.;*

*a cleansing head portion disposed at the proximal end of said handle portion structured to fit within a user's mouth, said cleansing head portion having a bottom face, a top face, and a side edge; and*

*a plurality of bristles protruding from the bottom face of said cleansing head portion in a generally perpendicular relation thereto.*

* * * * *